(12) United States Patent  
Caulier

(10) Patent No.: US 10,720,251 B2
(45) Date of Patent: Jul. 21, 2020

(54) METHOD AND DEVICE FOR INSPECTING A NUCLEAR REACTOR PART

(71) Applicant: FRAMATOME, Courbevoie (FR)

(72) Inventor: Yannick Caulier, Manosque (FR)

(73) Assignee: FRAMATOME, Courbevoie (FR)

( * ) Notice: Subject to any disclaimer, the term of this patent is extended or adjusted under 35 U.S.C. 154(b) by 0 days.

(21) Appl. No.: 16/312,275

(22) PCT Filed: Jun. 21, 2017

(86) PCT No.: PCT/EP2017/065209
§ 371 (c)(1),
(2) Date: Dec. 20, 2018

(87) PCT Pub. No.: WO2017/220641
PCT Pub. Date: Dec. 28, 2017

(65) Prior Publication Data
US 2019/0237208 A1  Aug. 1, 2019

(30) Foreign Application Priority Data

Jun. 22, 2016  (FR) .................................. 16 55820

(51) Int. Cl.
| | |
|---|---|
| *G01N 21/00* | (2006.01) |
| *G21C 17/08* | (2006.01) |
| *G21C 17/003* | (2006.01) |
| *G06T 7/73* | (2017.01) |
| *H04N 5/232* | (2006.01) |
| *G06T 17/00* | (2006.01) |
| *G21C 17/007* | (2006.01) |
| *H04N 5/225* | (2006.01) |

(52) U.S. Cl.
CPC .............. *G21C 17/08* (2013.01); *G06T 7/75* (2017.01); *G06T 17/00* (2013.01); *G21C 17/003* (2013.01); *G21C 17/007* (2013.01); *H04N 5/2256* (2013.01); *H04N 5/232125* (2018.08); *H04N 5/232133* (2018.08)

(58) Field of Classification Search
CPC ... H01J 37/32935; G01N 21/64; G01N 21/68; G01N 2015/1037; G01J 3/02
USPC ............................................................ 356/72
See application file for complete search history.

(56) References Cited

U.S. PATENT DOCUMENTS

| | | |
|---|---|---|
| 5,608,529 A | 3/1997 | Hori |
| 5,787,137 A | 7/1998 | Nelson, III et al. |
| 2007/0110294 A1* | 5/2007 | Schaap .................... G06K 9/40 |
| | | 382/131 |

FOREIGN PATENT DOCUMENTS

JP          H10221256 A  * 8/1998

OTHER PUBLICATIONS

Corresponding Search Report for PCT/EP2017/065209.

* cited by examiner

*Primary Examiner* — Md M Rahman
(74) *Attorney, Agent, or Firm* — Davidson, Davidson & Kappel, LLC

(57) ABSTRACT

A method for inspecting a nuclear reactor part includes placing an optical sensor (38) in front of the part to be inspected using a carrier (40); acquiring at least a first image of at least a reference portion of the part using the optical sensor (38), the or each first image being taken with a first magnification; reconstituting a three-dimensional model of said reference portion of the part using the or each first acquired image; calculating the position of an area to be inspected relative to the optical sensor (38) using the three-dimensional model; acquiring at least a second image of the area to be inspected using the optical sensor (38), the or each second image of the area to be inspected being taken with a second magnification higher than the first magnification.

14 Claims, 3 Drawing Sheets

METHOD AND DEVICE FOR INSPECTING A NUCLEAR REACTOR PART

The invention generally relates to the inspection of parts of a nuclear reactor.

BACKGROUND

During certain maintenance operations of the nuclear reactor, it is requested to visually inspect specific areas of parts located near the inside of the pressurized vessel of the nuclear reactor.

These parts are for example the vessel bottom entries, or elements of the devices for keeping bottom internal equipment in position.

To that end, it is possible to use a carrier that keeps a camera in position facing the part to be inspected.

The control command device of the carrier allows placement of the camera with an error on the position that is frequently of several centimeters. To be able to inspect a precise location of the part, it is necessary to recalibrate the position of the camera. To that end, a corner of the part is for example used, when said part has one. The position of the camera is successively adjusted with respect to each of the three surfaces coming together on the corner.

SUMMARY OF THE INVENTION

Such an operation is time-consuming. Furthermore, it involves multiple movements of the carrier, controlled remotely, which creates a risk of collision with other pieces of equipment inside the vessel.

In this context, an inspection method is provided that does not have the above flaws.

To that end, a method is provided for inspecting an area of a nuclear reactor part, the method comprising the following steps:

placing an optical sensor in front of the part to be inspected using a carrier;
acquiring at least a first image of at least a reference portion of the part using the optical sensor, the or each first image being taken with a first magnification;
reconstituting a three-dimensional model of said reference portion of the part using the or each first acquired image;
calculating the position of an area to be inspected relative to the optical sensor using the three-dimensional model;
acquiring at least a second image of the area to be inspected using the optical sensor, the or each second image of the area to be inspected being taken with a second magnification higher than the first magnification.

Thus, the same optical sensor is used both to recalibrate the position of the sensor with respect to the part and the area to be inspected, and to inspect the area.

The recalibration is done only by calculation, and does not require multiple movements of the carrier.

The inspection method is therefore accelerated, and the risks of interference with other pieces of equipment of the reactor are decreased.

The method may further have one or more of the features below, considered individually or according to any technical possible combination(s):

the optical sensor comprises a camera, the or each first image and the or each second image being acquired using the camera;
the camera comprises a variable-focus lens and a motor for changing the focus of the lens, usable to modify the magnification between the step for acquiring at least a first image and the step for acquiring at least a second image;
the optical sensor comprises a light source, said reference portion of the part being illuminated by a structured light during the step for acquiring at least a first image;
the method comprises a step for reconstituting a three-dimensional model of said area to be inspected by using the or each second acquired image, preferably by the optical blur method; and
the nuclear reactor comprises a vessel, internal equipment and a plurality of nuclear fuel assemblies, the internal equipment and the nuclear fuel rods being arranged in the vessel during a normal operating phase of the nuclear reactor, the method being carried out during a stopping phase of the nuclear reactor, the part being located inside the vessel and for example being a vessel bottom entry or an element of a device for keeping internal equipment circumferentially in position around a central axis of the vessel.

A device for inspecting an area of a nuclear reactor part is also provided, the device comprising an optical sensor and a carrier configured to place the optical sensor in front of the part to be inspected, the optical sensor being configured to:

acquire at least a first image of at least a reference portion of the part, the or each first image being taken with a first magnification;
reconstitute a three-dimensional model of said reference portion of the part using the or each first acquired image;
calculate the position of an area to be inspected relative to the optical sensor using the three-dimensional model;
acquire at least a second image of the area to be inspected, the or each second image of the area to be inspected being taken with a second magnification higher than the first magnification.

The device is specially adapted for carrying out the inspection method having the features described above. Furthermore, the inspection method is also specially adapted for being implemented by the inspection device.

The device may further represent one or more of the features below, considered individually or according to any technical possible combination(s):

the optical sensor comprises a single camera configured to acquire the or each first image and the or each second image;
the camera comprises a variable-focus lens and a motor for changing the focus of the lens;
the optical sensor comprises a light source configured to illuminate said reference portion of the part with a structured light during the step for acquiring at least a first image; and
the optical sensor comprises a module for reconstituting a three-dimensional model of said area to be inspected by using the or each second acquired image, preferably by the optical blur method.

BRIEF SUMMARY OF THE DRAWINGS

Other features and advantages of the invention will emerge from the detailed description thereof provided below, for information and non-limitingly, in reference to the appended figures, in which.

DETAILED DESCRIPTION

Figure 1:
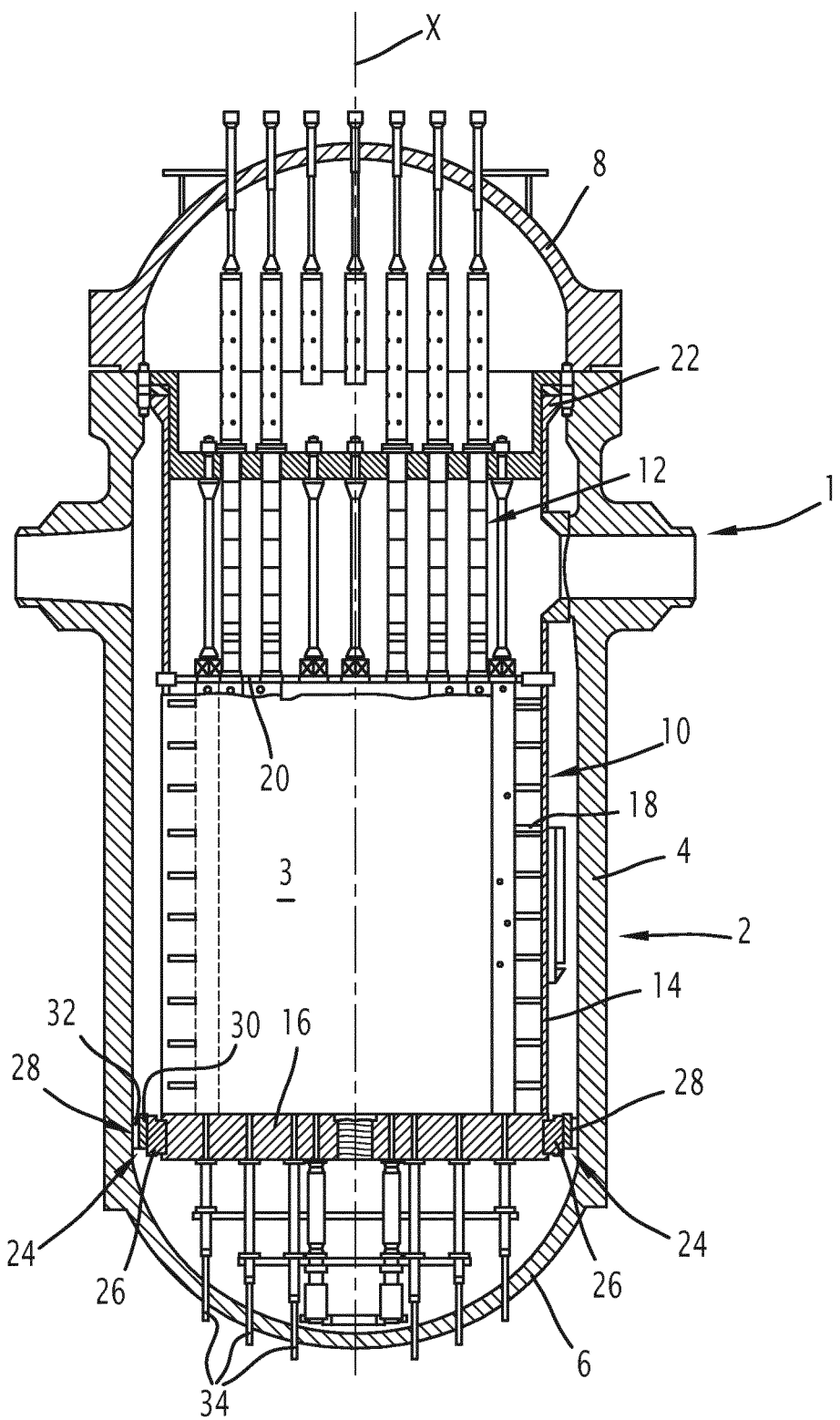
FIG. 1 is a simplified illustration, in axial cross-section, of the tank of a nuclear reactor.

The method and the device according to the present disclosure are intended to inspect an area of a nuclear reactor part. Said nuclear reactor is for example a pressurized water reactor, with level 900 MW, as shown in FIG. 1.

The method and the device according to the present disclosure are also suitable for any other type of reactor, for example BWR, and all levels and types of PWR reactor.

The reactor 1 comprises a vessel 2, in which a core 3 is positioned. The core 3 includes a plurality of nuclear fuel assemblies, with a generally prismatic shape. The vessel has a central axis X, which is substantially vertical. The vessel comprises a substantially cylindrical shroud 4, a hemispherical lower bottom 6, closing a lower end of the shroud 4, and a removable cover 8, closing an upper end of the shroud 4.

The nuclear reactor 1 also comprises pieces of lower internal equipment 10 (IIE) and pieces of upper internal equipment 12, positioned inside the vessel 2. The pieces of lower internal equipment 10 comprise a core enclosure 14 with a generally cylindrical shape and a core support plate 16, secured to a lower end of the core enclosure 14. The core enclosure 14 is in a coaxial arrangement relative to the vessel. The fuel assembly is positioned inside the core enclosure, and pressed on the core support plate 16. The core enclosure 14 closes the partition 18, extending at the periphery of the core 3 and designed to keep the nuclear fuel assemblies in position.

The pieces of upper internal equipment 12 comprise an upper core plate 20, which rests on the upper part of the assemblies of the core 3 by springs. The pieces of lower and upper internal equipment 10, 12 are suspended inside the vessel 2 by an upper part 22 that is fastened on an upper edge of the shroud 4, slightly below the connecting plane of the cover 8 on the shroud 4.

In the illustrated example, four guide devices 24 are distributed around the core support plate 16, so as to keep the pieces of lower internal equipment 10 in position circumferentially around the axis X, and radially relative to the axis X. However, the guide devices 24 allow axial movements of the pieces of lower internal equipment 10 relative to the vessel, for example under the effect of the differential expansions.

In the illustrated example, each guide device 24 includes a rail 26, fastened on an outer peripheral edge of the core support plate 16, and a female part 28 rigidly fastened on an inner surface of the shroud 4 of the vessel, opposite the rail 26.

As illustrated in FIG. 1, the female part 28 typically includes a guideway 30 and a massive support 32, called M support, rigidly fastened to the shroud 4 of the vessel. The guideway 30 has, perpendicular to the axis X, a U-shaped section open radially toward the inside of the vessel. Circumferentially, the separation between the inner faces of the two branches of the U is slightly larger than the separation between the two side faces 34 of the rail.

As shown in FIG. 1, the nuclear reactor further includes vessel bottom entries 34 passing through the lower bottom 6. The vessel bottom entries (VBE) are for example intended for inserting mobile neutron measuring probes into the reactor core.

The core 3 and the pieces of internal equipment 10, 12 are arranged in the vessel during a normal operating phase of the nuclear reactor. A normal operating phase here refers to the phases where the nuclear reactor produces vapor, the vessel being pressurized.

The method and the inspection device according to the present disclosure are intended to be implemented during a stopped phase of the nuclear reactor. The inspection takes place after opening the vessel 2 and discharging the core 3, as well as the lower and upper internal equipment 10, 12, outside the vessel, as illustrated in FIG. 2.

The method and the device according to the present disclosure are well suited for inspecting vessel bottom entries 34, and for inspecting various elements of guide devices 24, in particular the female part 28, and more specifically the guideway 30 and the M support 32.

However, the method and the device according to the present disclosure can also be used to inspect other elements, located inside the vessel 1 or outside the vessel 1.

Figure 2:
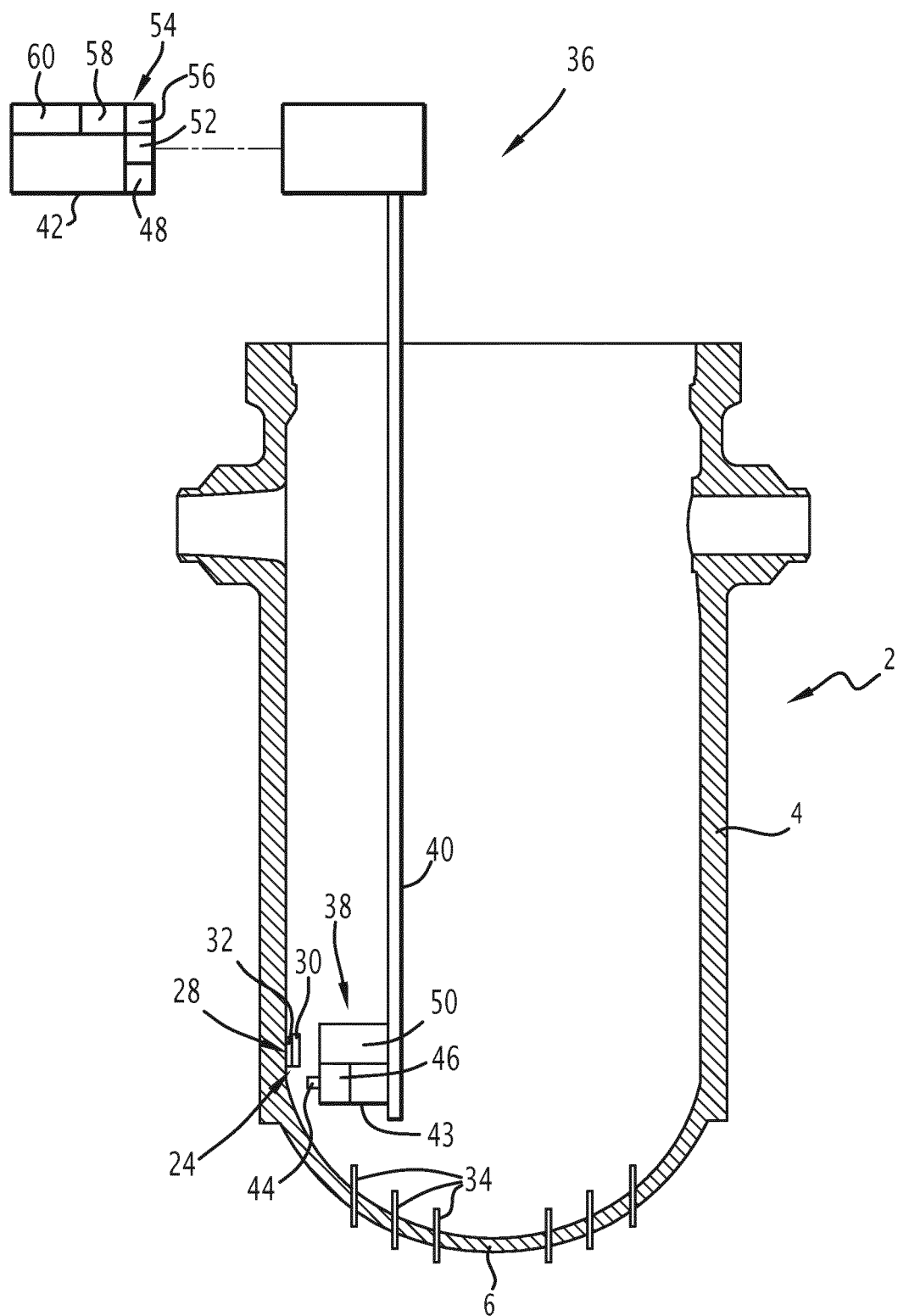
FIG. 2 is a view similar to that of FIG. 1, wherein the vessel cover and the internal equipment have been disassembled, and an inspection device according to an embodiment of the invention has been positioned.

The inspection device 36 includes, as shown in FIG. 2, an optical sensor 38 and a carrier 40 configured to place the optical sensor 38 in front of the part to be inspected.

The carrier is of any appropriate type. The carrier 40 is for example a mast, or a robotic arm. Typically, the carrier 40 is remotely operated from a driving station 42 located at a distance from the vessel.

The optical sensor 38 is configured to:
acquire at least a first image of at least a reference portion of the part to be inspected;
reconstitute a three-dimensional model of said reference portion using the or each first acquired image;
calculate the position of the area to be inspected relative to the optical sensor 38 using the three-dimensional model;
acquire at least one second image of the area to be inspected.

To that end, the optical sensor 38 comprises a single camera 43, configured to acquire the or each first image and the or each second image.

The or each first image is taken with a first magnification, the or each second image being taken with a second magnification higher than the first magnification.

In other words, the first image intended to allow the recalibration of the optical sensor 38 relative to the area be inspected is taken with a relatively larger field, and optionally in a position of the device different from that adopted to acquire the second image. For example, each acquired image covers a surface area of the part between 20×20 mm$^2$ and 1000×1000 mm$^2$, preferably between 100×100 mm$^2$ and 500×500 mm$^2$, and for example equal to about 300×300 mm$^2$.

The second image(s), provided for anomaly detection in the area to be inspected, are acquired in near field, so as to allow fine detection. Each image acquired as a surface of the area to be inspected is between 1×1 mm$^2$ and 10×10 mm$^2$, for example equal to 5×5 mm$^2$.

In order to acquire both first and second images with the same camera, said camera 43 advantageously comprises a variable-focus lens 44 and a motor 46 for changing the focus of the lens 44. The motor 46 is configured to make it possible to change the magnification for acquiring images, and also to perform focusing.

Advantageously, the optical sensor 38 comprises a remote control 48 of the motor 46. This remote control 48 is configured to make it possible to adjust the focal distance of the lens 44, for example from the control station 42.

The optical sensor 38 advantageously comprises a light source 50 configured to illuminate the reference portion with a structured light during the acquisition of the or each first image.

The light source 50 is thus arranged to project a light pattern on the reference portion of the part, said light pattern being of any appropriate type. It for example includes parallel lines (sinusoidal or rectangular, with different periods and phases) and/or a checkerboard and/or a granulated effect.

Advantageously, the optical sensor 38 includes a module 52 for remotely controlling the light source 50, for example from a control station 42.

The optical sensor 38 typically comprises an information processing unit 54 formed by a processor and a memory associated with the processor. The first images acquired by the camera 43 are sent to the information processing unit 54 and stored in the memory.

The optical sensor 38 comprises a module 56 for reconstituting the three-dimensional model of said reference portion of the part using the or each first acquired image. Said module 56 is typically software stored in the memory and able to be executed by the processor.

Such software is known, and is for example supplied by the companies GOM and Steinbichler Optotechnik.

The principle is that, when the light pattern is projected on a three-dimensional surface, said pattern appears deformed when it is observed from a direction other than the projection direction. This deformed pattern is visible on the first image(s), and is used to reconstruct the three-dimensional geometric shape of the portion of the reference.

The optical sensor 38 further comprises another module 58 programmed to calculate the position of the area to be inspected relative to the optical sensor. Said module 58 is typically software stored in the memory of the unit 54 and able to be executed by the processor.

The module 58 includes, in memory, a three-dimensional theoretical digital model of the part, covering the reference portion of the part and the area to be characterized.

The module 58 is programmed to compare the three-dimensional model reconstituted by the model 56 and the three-dimensional theoretical model for the portion of the reference, and to deduce therefrom, by calculation, the position of the optical sensor 38 relative to the reference portion.

The module 58 is also programmed to calculate the position and the orientation of the area to be inspected relative to the optical sensor, by using the position of the optical sensor 38 relative to the reference part previously calculated, and the position of the area to be inspected relative to the reference part provided by the theoretical three-dimensional model.

Furthermore, the optical sensor 38 includes a module 60 for reconstituting the three-dimensional model of the area to be inspected by using the second acquired images. Said module 60 is typically software stored in the memory of the unit 54 and able to be executed by the processor.

The acquired second image(s) are sent to the information processing unit 54 and stored in the memory.

Preferably, the optical sensor 38 is configured to reconstruct a three-dimensional model of the inspected area by using the optical blur technique.

The optical blur technique is known.

Thus, the optical sensor 38 comprises calculating modules 56 and/or 58 and/or 60, configured respectively to carry out the reconstitution of the three-dimensional model of the reference portion of the part by using the or each first acquired image, the calculation of the position of the area to be inspected relative to the optical sensor by using the three-dimensional model, and the reconstitution of a three-dimensional model of said area to be inspected by using the or each second acquired image.

According to a first alternative, the three-dimensional reconstruction method called DFF (Depth From Focus) is applied. The optical sensor 38 is configured to have a constant image acquisition axis during the acquisition of the second images. It is configured to acquire several second images, each time offsetting the maximum sharpness plane along the acquisition axis between the images, without moving. The module 60 is programmed next to combine the sharp regions of the different captured images and to reconstruct the three-dimensional relief of the area to be inspected.

According to another alternative, the three-dimensional reconstruction method called DRD (Depth From Defocus) is applied. At least one second image is analyzed. The relief of the inspected area is reconstructed by analyzing the optical blur level in the or each second image. In the or each second image, the higher the blur level of a zone is, the more it is shifted depthwise relative to the sharpness zone. By knowing the optical parameters of the optical sensor 38, it is possible to determine the depth of the point of the area to be inspected associated with each pixel of the second image.

The optical blur level in an image is for example measured by measuring the contrast in the image. A low contrast indicates a fuzzy region of the image, while a high contrast indicates a sharp region of the image.

Advantageously, a textured light pattern is projected on the area to be inspected, so as to increase the contrast and improve the precision of the optical blur analysis. This light pattern, like before, for example comprises parallel lines, fringes or a checkerboard.

According to another alternative, the three-dimensional model of the area to be inspected is reconstructed using the method described in the application published under number FR 2,995,438.

Alternatively, the modules 56, 58 and 60 are made in the form of programmable logic components, such as FPGA (Field-Programmable Gate Arrays), or in the form of dedicated integrated circuits, such as ASIC (Application-Specific Integrated Circuits).

It should be noted that the carrier 40 and the optical sensor 38 are suitable for being used underwater.

The inspection method according to an embodiment of the invention will now be described.

Figure 3:
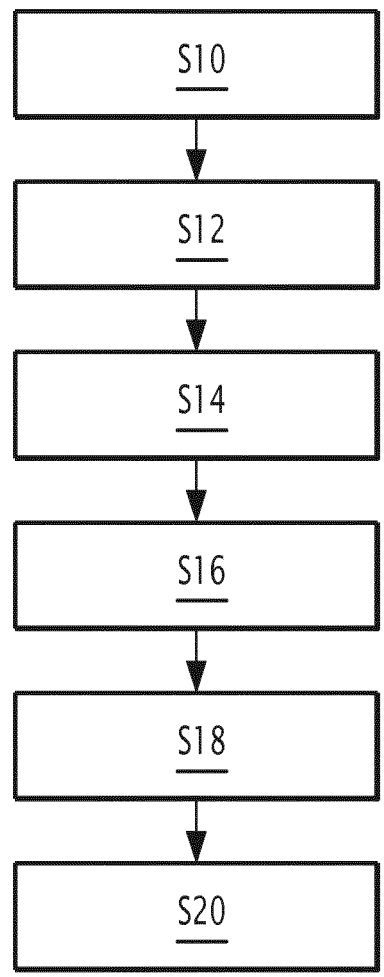
FIG. 3 is a diagram of steps of an inspection method according to an embodiment of the invention.

As shown in FIG. 3, this method comprises at least the following steps:

S10: placing an optical sensor 38 in front of the part to be inspected using a carrier 40;

S12: acquiring at least a first image of at least a reference portion of the part using the optical sensor 38, the first image being taken with a first magnification;

S14: reconstituting a three-dimensional model of said reference portion of the part using the or each first acquired image;

S16: calculating the position of the area to be inspected relative to the optical sensor 38 using the three-dimensional model;

S18: acquiring at least a second image of the area to be inspected using the optical sensor 38, the or each second image of the area to be inspected being taken with a second magnification higher than the first magnification, after optionally moving the optical sensor 38.

The carrier 40 is typically of the type described above. It makes it possible to arrange the optical sensor 38 with an error on the position of several centimeters relative to the part to be inspected. Preferably, the optical sensor 38 is positioned in front of a protruding portion of the part, for example a rim or corner.

The optical sensor 38 is typically of the type described above.

In step S12, the magnification to be used for the acquisition of the or each first image is controlled remotely, from the control station 42. The first magnification depends on the size of the reference portion. The reference portion of the part is typically illuminated by a structured light during the acquisition of the or each first image, as described above. The structured light includes patterns such as parallel lines, a checkerboard, fringes, etc.

The patterns are chosen based on the shape of the reference portion of the part to be illuminated.

The first image(s) are acquired in medium field, the or each acquired image covering a surface area of the reference portion between $20\times20$ mm$^2$ and $1000\times1000$ mm$^2$, preferably between $100\times100$ mm$^2$ and $500\times500$ mm$^2$, and equal to about $300\times300$ mm$^2$.

Typically, the acquisition of the or each first image is triggered from the control station 42.

The first image(s) are sent to the information processing unit 54 and stored in the memory of said unit.

The three-dimensional model of the reference portion of the part is reconstituted by computation. As previously indicated, the light pattern projected on the reference portion appears deformed when it is observed from a direction other than the projection direction. This deformed pattern is visible in the or each first image. Said image(s) are used to reconstruct the geometric shape of the reference portion of the part.

Alternatively, other three-dimensional reconstitution techniques are used, such as a technique for computing the time of flight (TOF) of the light, or a triangulation technique using a line of light projected and scanned on the surface to be reconstructed.

To calculate the position of the area to be inspected relative to the optical sensor 38, a theoretical three-dimensional model of the part is used, covering at least the reference portion and the area to be inspected.

The position of the optical sensor relative to the reference portion is first evaluated by using the three-dimensional model previously reconstituted and the theoretical three-dimensional model of the part. Then, the position of the area to be inspected relative to the optical sensor is calculated, using the position of the reference portion with respect to the optical sensor previously calculated and the position of the area to be inspected with respect to the reference portion given for the theoretical three-dimensional model.

Before starting step S18 for acquiring the second image(s), the magnification of the images acquired by the optical sensor is modified, from the control station 42. More specifically, the focal distance of the lens 44 is modified by actuating the motor 46, from the control station 42, such that the or each second image is taken with the second magnification. The second magnification depends on the size of the area to be inspected.

During the acquisition step S18, one or several second images are acquired, based on the type of exploitation of the images implemented. Said images are sent to the information processing unit 54 and stored in the memory of said unit.

Advantageously, the method includes a step S20 for three-dimensional reconstruction of the area to be inspected by using the acquired second image(s).

This three-dimensional reconstruction method typically uses the optical blur method. Such a method makes it possible to characterize surface anomalies smaller than a tenth of a millimeter in near field. Near field refers to the fact that each acquired second image covers a surface of the area to be inspected between $1\times1$ mm$^2$ and $10\times10$ mm$^2$.

The three-dimensional model of the area to be inspected is reconstituted by computation, using the or each second image. The reconstitution is done using the three-dimensional reconstitution method called DFF (Depth From Focus), or the three-dimensional reconstitution method called DFD (Depth From Defocus), or the three-dimensional reconstruction method published under number FR 2,995,438.

The method and device are alternatively implemented with a camera for acquiring one or more first images, and another camera, different from the first, for acquiring the or each second image. Advantageously, each camera has its own lighting device. Alternatively, the optical sensor has two cameras and a single lighting device.

The invention claimed is:

1. A method for inspecting an area of a nuclear reactor part, the method comprising:
   placing an optical sensor in front of the nuclear reactor part to be inspected using a carrier;
   acquiring at least a first image of at least a reference portion of the nuclear reactor part using the optical sensor, the first image being taken with a first magnification;
   reconstituting a three-dimensional model of the reference portion of the nuclear reactor part using the first image;
   calculating a position of an area to be inspected relative to the optical sensor using the three-dimensional model; and
   acquiring at least a second image of the area to be inspected using the optical sensor, the second image of the area to be inspected being taken with a second magnification higher than the first magnification.

2. The method according to claim 1, wherein the optical sensor comprises a camera, the first image and the second image being acquired using the camera.

3. The method according to claim 2, wherein the camera comprises a variable-focus lens and a motor for changing the focus of the lens, used to modify the magnification between the step for acquiring at least a first image and the step for acquiring at least a second image.

4. The method according to claim 2, wherein the optical sensor comprises a light source, the reference portion of the nuclear reactor part being illuminated by a structured light during the step for acquiring at least a first image.

5. The method according to claim 1, further comprising reconstituting a three-dimensional model of the area to be inspected by using the second acquired image.

6. The method according to claim 5, wherein the step for reconstituting a three-dimensional model is carried out by an optical blur method.

7. A method for inspecting an area of a nuclear reactor part, the method comprising:
   placing an optical sensor in front of the nuclear reactor part to be inspected using a carrier;

acquiring at least a first image of at least a reference portion of the nuclear reactor part using the optical sensor, the first image being taken with a first magnification;

reconstituting a three-dimensional model of the reference portion of the nuclear reactor part using the first image;

calculating a position of an area to be inspected relative to the optical sensor using the three-dimensional model; and acquiring at least a second image of the area to be inspected using the optical sensor, the second image of the area to be inspected being taken with a second magnification higher than the first magnification, wherein the nuclear reactor comprises a vessel, internal equipment and a plurality of nuclear fuel assemblies, the internal equipment and the nuclear fuel assemblies being placed in the vessel during a normal operating phase of the nuclear reactor, the method being carried out during a stopping phase of the nuclear reactor, the nuclear reactor part being located inside the vessel.

8. The method according to claim 7, wherein the nuclear reactor part is a vessel bottom entry or an element of a device for keeping internal equipment circumferentially in position around a central axis of the vessel.

9. A device for inspecting an area of a nuclear reactor part, the device comprising:

an optical sensor; and a carrier configured to place the optical sensor in front of the nuclear reactor part to be inspected, the optical sensor being configured to:

acquire at least a first image of at least a reference portion of the nuclear reactor part, the first image being taken with a first magnification;

reconstitute a three-dimensional model of the reference portion of the nuclear reactor part using the first image;

calculate the position of an area to be inspected relative to the optical sensor using the three-dimensional model; and acquire at least a second image of the area to be inspected, the second image of the area to be inspected being taken with a second magnification higher than the first magnification.

10. The device according to claim 9, wherein the optical sensor comprises a single camera configured to acquire the first image and the second image.

11. The device according to claim 10, wherein the camera comprises a variable-focus lens and a motor for changing the focus of the lens.

12. The device according to claim 10, wherein the optical sensor comprises a light source configured to illuminate the reference portion of the nuclear reactor part with a structured light during the acquiring of at least the first image.

13. The device according to claim 9, wherein the optical sensor comprises a module for reconstituting a three-dimensional model of the area to be inspected by using the second image.

14. The device according to claim 13, wherein the module for reconstituting a three-dimensional model is configured to use an optical blur method.

\* \* \* \* \*